United States Patent [19]

Maki

[11] Patent Number: 5,288,530
[45] Date of Patent: Feb. 22, 1994

[54] TRIM FOR INSTALLATION TO AUTOMOBILES

[75] Inventor: Renji Maki, Kariya, Japan

[73] Assignee: Tokai Kogyo Kabushiki Kaisha, Ohbu, Japan

[21] Appl. No.: 883,678

[22] Filed: May 15, 1992

[30] Foreign Application Priority Data

May 15, 1991 [JP] Japan .............................. 3-043711[U]

[51] Int. Cl.$^5$ .............................................. B60R 13/04
[52] U.S. Cl. .......................................... 428/31; 428/99; 24/289; 52/716.5; 52/718.01; 293/128
[58] Field of Search ............................ 428/99, 100, 31; 52/717.1, 718.1; 24/294, 297, 289; 293/128

[56] References Cited

U.S. PATENT DOCUMENTS 3,636,593  1/1972  Buttriss et al. ........................ 24/294

Primary Examiner—Alexander S. Thomas
Attorney, Agent, or Firm—Oblon, Spivak, McClelland, Maier & Neustadt

[57] ABSTRACT

This invention employs a structure wherein the coupling section 23b of the clip 23 is engaged to the coupling section 23b of the clip 23 is engaged to the coupling section 25b of the holder 25 by sliding the clip 23 at an angle to the widthwise direction perpendicular to the longitudinal direction of the trim 24, wherein the position of the coupling section 25b of the holder 25 is wherein the recessed groove in the automobile body panel 21 for installation of said trim may be formed by shallower drawing, thus enabling satisfactory molding of trim 24 to be realized without affecting the standard press working processes of the automobile body panel 21.

6 Claims, 4 Drawing Sheets

TRIM FOR INSTALLATION TO AUTOMOBILES

BACKGROUND OF THE INVENTION

1. Field of the Invention

This invention relates to trim for installation to panels of automobiles by means of clips.

2. Description of the Prior Art

Various types of trims such as side protector trims are currently installed to the body panels of automobiles.

From the viewpoint of automotive applications, in order to fix these trims to automobile body panels, a fixing method is widely employed wherein clips are connected to holders mounted on the back side of the trims and said clips are inserted into mounting holes to fix said trim in place. An example of a conventional type of trim fixing method for automotive application is explained in FIGS. 5 and 6.

As shown in the drawings, a pair of holders 5 are mounted on the back side of a long trim 4, and a clip 3 is connected to each holder 5.

In the automobile body panel 1, a series of pairs of mounting holes corresponding to said pairs of clips 3 have been formed, and said pairs of clips 3 are inserted into corresponding said pairs of mounting holes 2 to fix said trim 4 in place.

The clip 3 is equipped with a base plate 3b which is slid into an engagement groove 5a provided in the holder 5 for fixing, and a catch-piece 3a of arrow shape which is inserted into the mounting hole 2 in the automobile body panel 1 for fastening to the panel.

The engagement grooves 5a of the holders 5 are directed in the longitudinal direction of the trim 4 and the base plates 3b of said clips 3 are slid through the openings of said engagement grooves 5a facing in the same longitudinal direction until they contact the closed ends of said engagement grooves 5a to complete fastening.

As aforementioned, the holders 5 and clips 3 are mounted in the longitudinal direction in pairs on the trim 4 and the pair of holders 5 are mounted in symmetrical positions so that each opening of said engagement grooves 5a faces the other.

Thus a fixing structure with opposite stopping directions is constructed and by fastening the trim 4 longitudinally, an immobile status of said fixing structure can be achieved.

Trims for automotive applications of said structure are usually molded using synthetic resin materials. When molding the pair of engagement grooves 5a of the holders 5, a pair of sliding cores are placed in the positions of said engagement grooves 5a and on completion of the molding process, the pair of sliding cores are slid inwards and are drawn through the openings of the engagement grooves 5a.

Nevertheless, as aforementioned, in the conventional trim fixing structure wherein a pair of facing engagement grooves 5a are symmetrically positioned along the longitudinal direction of the trim 4 and a pair of clips 3 are inserted for fixing into the engagement grooves 5a, the plate constituting part of said engagement groove 5a is set to a considerable span in the longitudinal direction of said trim 4 and such long span contributes to obtaining the required trim fixing force.

For this reason, the pair of sliding cores of the mold used to form the pair of engagement grooves 5a have considerable span along the longitudinal direction of the trim 4 and substantial space is required to slide out said pair of sliding cores of the mold.

Consequently, with the conventional structure of trims for automotive applications, a problem exists wherein molding of synthetic resins to a trim of less than a certain length is not feasible.

In order to solve this problem, as indicated in FIG. 4, the applicant of this invention proposes a trim for automotive applications wherein the base plate 13a of the clip 13 is slid in widthwise, namely, perpendicular to the longitudinal direction of the trim 14 to engage said base plate 13a into the baseplate rest 15a of the holder 15. Accordingly, the longitudinal span of the pair of baseplate rests 15a on the trim 14 may be set to a very short length thus enabling reduction of the space needed to slide out the sliding cores of the mold. Consequently, trims of shorter length may also be molded successfully.

Nevertheless, in order to accomplish slide-in engagement of the clip 13 under this invention, it is necessary for the top end (the position marked B in FIG. 4) of the baseplate rest 15a of said holder 15 to be positioned further in towards the automobile body panel 11 as compared with the position of the side end (the position marked A in FIG. 4) of the trim 14.

For this reason, in order to effectively install said trim 14, it becomes necessary to provide recessed groove 11a to accept the base plate 13a of the clip 13. The depth of said recessed groove 11a should be, as aforementioned, sufficiently deep to accept the inwardly protruding baseplate 13a of the clip 13. Consequently, considerably deep drawing becomes necessary in the press working of the automobile body panel 11, which may cause problems in the press working process.

On the other hand, it may also be possible to mold the trim 14 itself in a deeper indented shape, but in this case the overall height of the trim becomes too great for it to be employed for automotive application.

This invention therefore aims at providing, through satisfactory molding, a trim suitable for installation to the panels of automobile bodies, which requires no modification to standard press working processes for automobile body panels.

SUMMARY OF THE INVENTION

In order to accomplish the aforementioned purposes, this invention proposes a trim for installation to panels of automobiles having a structure wherein a clip is slid into a holder for engagement thereto, said holder being mounted on the back surface of a long length of trim, wherein the clip is inserted into a mounting hole provided in the automobile body panel thus fixing the trim to the panel, wherein the coupling sections of the holder and clip are directed perpendicularly to the longitudinal direction of the trim, and wherein also, the coupling sections are not parallel with the surface line of the automobile body panel but are at an angle to this surface line.

With said construction, when inserting the engaging section of the clip to that of the holder, the clip is slid in a direction which is at an angle to the direction perpendicular to the longitudinal direction of the trim.

In this way, the sliding movement for engagement may be carried out without interference by the edge of the trim itself thus enabling satisfactory sliding in and engagement of the clip with the holder even if the coupling section of the holder is positioned further toward the back surface of the trim itself.

As aforementioned, the trim of this invention for installation to automobile panels has a structure wherein the clip may be slid into the holder at an angle to the widthwise direction of the trim or to the direction perpendicular to the longitudinal direction of the trim for engagement of the coupling section of the clip with that of the holder, thus enabling the coupling position of the holder to move toward the back surface of the trim, thus allowing shallower drawing when press working the recessed groove in the automobile body panel, enabling successful molding of trims without the need for deeper drawing of the recessed groove which tends to cause problems in the press working of automobile body panels.

DESCRIPTION OF THE PREFERRED EMBODIMENTS

Figure 1:
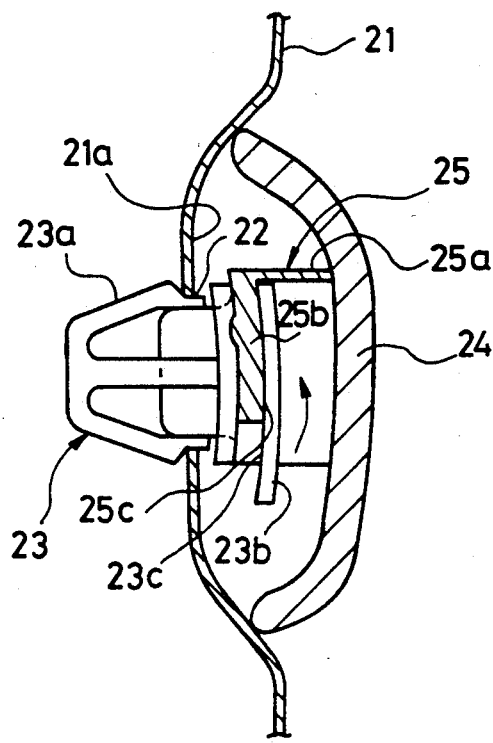
[FIG. 1] An explanatory cross-sectional drawing of the structure of a trim for installation to automobile panels, being an embodiment of this invention.
Figure 2:
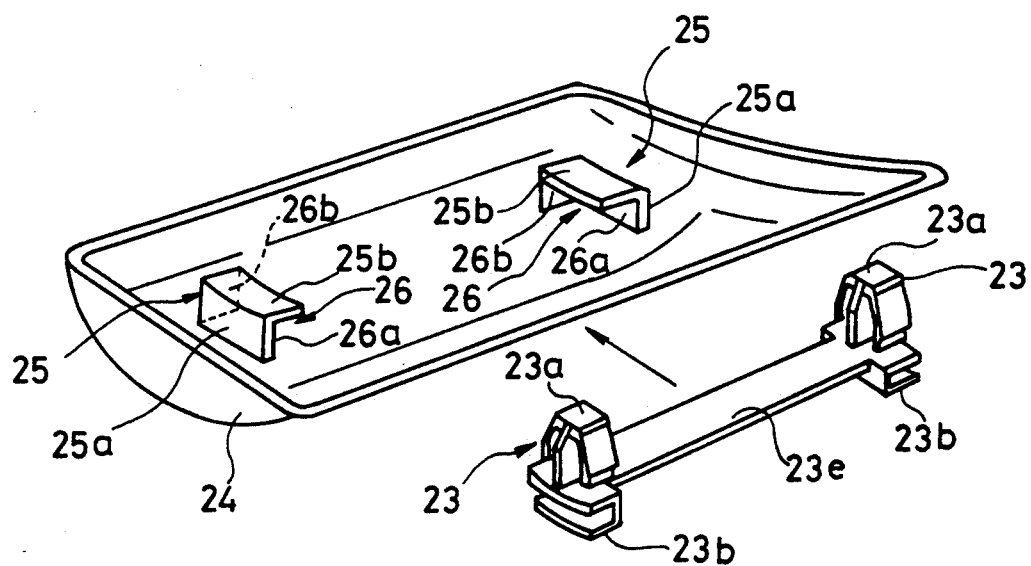
[FIG. 2] An explanatory oblique drawing of the back side of a trim for installation to automobile panels as shown in FIG. 1.

Referring more particularly to the exemplary embodiments of the present invention according to the drawings, as shown in FIGS. 1 and 2, on the back surface of the trim 24 molded in a long shape, a pair of holders 25 are provided at a certain span, and into said pair of holders 25, a dedicated pair of clips 23 are inserted for fastening.

Wherein, in the automobile body panel 21, a series of pairs of mounting holes 22 are provided at an interval corresponding to the distance between the pair of clips 23 and by insertion of the pair of clips 23 into the pair of mounting holes 22 for internal fastening, the trim 24 is fixed and installed to the automobile body panel 21.

The clip 23 consists of a catch-piece 23a of arrow shape which is inserted into the mounting hole 22 of the automobile body panel 21 for fastening to the panel and a base plate 23b which is held by the catch-piece 23a in the direction toward the outside of the automobile body panel 21 (toward the right side in FIG. 1) as a coupling section, and each base plate 23b of each of the pair of clips 23 is integrally molded with its counterpart clip on an integrally molded plate-like connecting strip 23e.

The holder 25 is comprised of an L-shaped coupling section in longitudinal-sectional-view formed by a wall section 25a provided on the back surface of the trim 24 and a baseplate rest 25b extending from the top end of the wall section 25a, and the space formed by the wall section 25a and baseplate rest 25b constitutes an engagement groove 26.

The baseplate rests 25b are in symmetrical positions facing each other above the engagement grooves 26 which are also facing each other.

Also, the wall section 25a and the baseplate rest 25b constituting the coupling section, extend in the widthwise direction, or perpendicular to the longitudinal direction of the trim 24.

At one end of the widthwise extension of the holder, an opening 26a is provided to accept the base plate 23b of the clip 23 and at the opposite end, a side wall 26b is provided to stop the base plate 23b of the clip 23.

The base plates 23b of the clips 23 are slid in the widthwise direction, or perpendicular to the longitudinal direction of the trim 24 into the engagement grooves 26 through the openings 26a until they contact the side walls 26b at which point they engage with the baseplate rests 25b of the holders 25.

Thus, the baseplate rest 25b of the holder 25 and the base plate 23b of the clip are so constructed as to engage with each other by sliding in the direction perpendicular to the longitudinal direction of the trim 24 and, moreover, in this embodiment, the sliding direction for engagement of the baseplate rest 25b and the base plate 23b is slanted to the widthwise direction of the trim 24 to form an angle.

In other words, the baseplate rest 25b of the holder 25 and the base plate 23b of the clip 23 are provided with circular arc contact surfaces 25c and 23c in cross-section in the direction perpendicular to the longitudinal direction of the trim, and such contact surfaces 25c and 23c are so designed as to be slid in for engagement in the locus of the circular arc and at an angle to the widthwise direction of the trim 14.

Also, the baseplate rest 25b of the holder 25 is positioned slightly inside the side edge of the trim 24 when seen in the vertical cross-section view of the automobile body panel 21. The base plate 23b of the mating clip 23 is positioned closer toward the trim 24 by the distance the baseplate rest 25b is inside the side edge of the trim 24.

As aforementioned, in this embodiment, when engaging the base plate 23b of the clip 23 to the baseplate rest 25b of the holder 25, the clip 23 is slid in a slanted direction to the widthwise direction perpendicular to the longitudinal direction of the trim 24.

Consequently, the clip 23 may be slid for engagement without interference by the side edge of the trim 24. As a result, as with this embodiment, even if the baseplate rest 25b of the holder 25 is positioned inside and toward the back surface of the trim 24, nothing interferes with the sliding-in and engagement of the holder 25 and the clip 23 and, consequently, the depth of the recessed groove 21a formed in the automobile body panel 21 can be very shallow.

Figure 3:
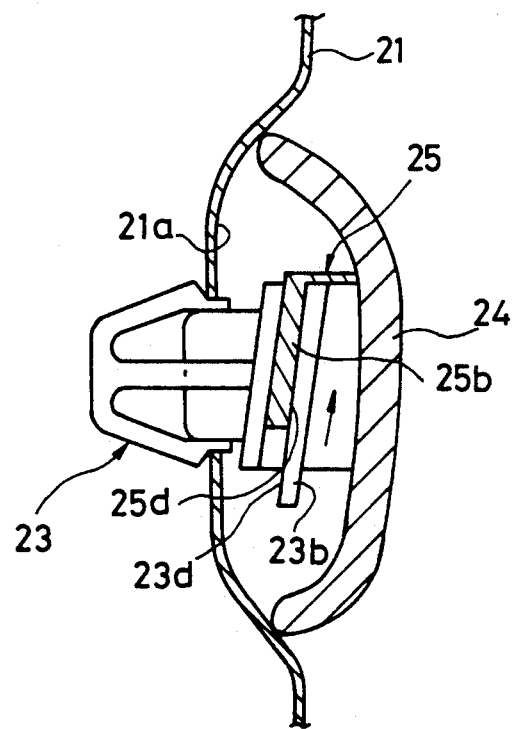
[FIG. 3] An explanatory cross-sectional drawing of a trim for installation to automobile panels, being another embodiment of this invention.
Figure 4:
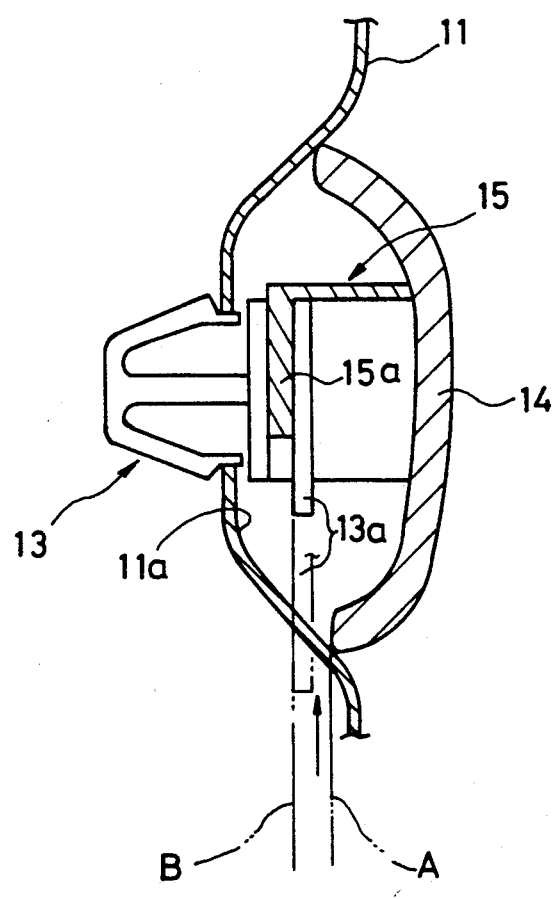
[FIG. 4] An explanatory cross-section drawing of the structure of a trim for installation to automobile panels, being a prior application.
Figure 5:
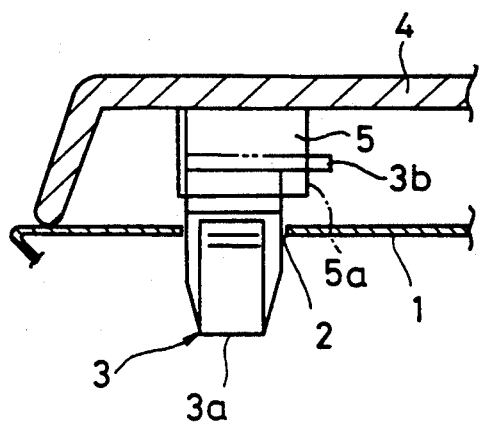
[FIG. 5] An explanatory longitudinal section drawing of a conventional trim for installation to automobile panels.
Figure 6:
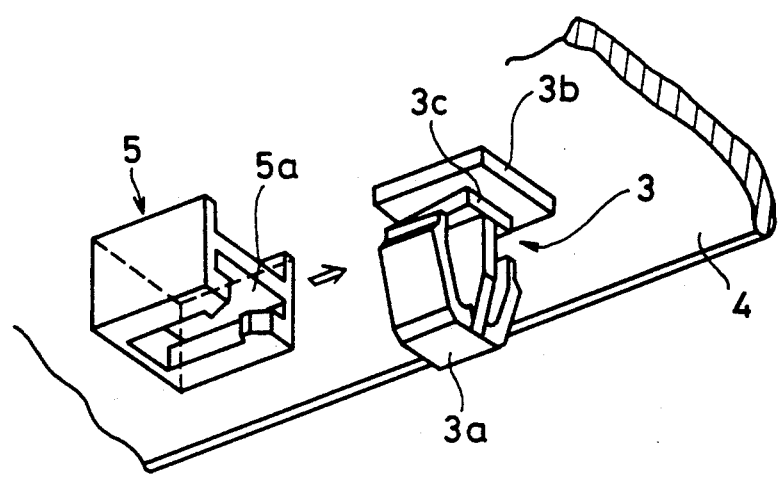
[FIG. 6] An explanatory oblique drawing of the back side structure of a conventional trim for installation to automobile panels.

In the embodiment as shown in FIG. 3, the baseplate rest 25b of the holder 25 and the base plate 23b of the clip 23 have straight contact surfaces in the sectional view in the direction perpendicular to the longitudinal direction of the trim 24 and are so designed that the contact surfaces 25d and 23d are slid together in a slanted direction to the widthwise direction of the trim, for engagement. With this embodiment also, similar advantages and effects as of the aforementioned embodiment can be obtained.

What is claimed is:

1. A trim for installation to the panels of automobiles wherein the trim itself is fixed to the automobile body panel by the insertion of clips into mounting holes provided in the automobile body panel comprising:

a trim member including a pair of holders spaced with respect to one another along a longitudinal direction of said trim, said holders located on a back surface of the trim member, said holders each including an opening, and wherein the openings of said holders face one another;

a pair of clips, each including a contact section which engages a contact section of a respective one of said holders; and wherein said contact sections of said holder and clip are arranged for engagement to slide in a direction at an angle to a widthwise direction, said widthwise direction extending perpendicular to the longitudinal direction of the trim.

2. A trim for installation to automobile panels as claimed in claim 1, further comprising coupling sections of the holder and clip having circular arc contact surfaces in cross section, which are perpendicular to the longitudinal direction of the trim.

3. The trim of claim 1, wherein said contact sections of said holder and clip include inclined surfaces which are in sliding contact when said pair of clips are connected to the trim member.

4. A trim assembly which can be installed by connection to panels of automobiles comprising:

a trim member including a recessed back surface;

a pair of holders mounted upon said back surface in said recess, said pair of holders spaced along a longitudinal direction of said trim member, and wherein said pair of holders each include engagement grooves, and further wherein an opening of an engagement groove of one of said pair of holders faces an opening of an engagement groove of the other of said pair of holders;

a clip member including a pair of base plates which are received by said grooves of said holders in a direction extending perpendicular to said longitudinal direction of said trim.

5. The trim assembly of claim 4, wherein said clip member includes a pair of clips connected by a connecting strip, and wherein a base plate is associated with each of said pair of clips.

6. The trim assembly of claim 4, wherein said holders each include a contact surface, and wherein said pair of base plates each include a contact surface, the contact surfaces of the holders contacting contact surfaces of said pair of base plates as said pair of base plates are in sliding engagement for mounting said clip member, and wherein when said contact surfaces of said base plate and said contact surfaces of said holder are in sliding engagement, a sliding direction is inclined with respect to said direction perpindicular to said longitudinal direction.

* * * * *